United States Patent
Wei et al.

(10) Patent No.: US 8,757,829 B2
(45) Date of Patent: Jun. 24, 2014

(54) BACKLIGHT SOURCE AND DISPLAY DEVICE

(75) Inventors: Yan Wei, Beijing (CN); Heecheol Kim, Beijing (CN); Chunfang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 219 days.

(21) Appl. No.: 13/473,735

(22) Filed: May 17, 2012

(65) Prior Publication Data

US 2012/0293983 A1    Nov. 22, 2012

(30) Foreign Application Priority Data

May 20, 2011  (CN) ...................... 2011 2 0163901 U

(51) Int. Cl.
| | |
|---|---|
| *G09F 13/14* | (2006.01) |
| *F21V 17/04* | (2006.01) |
| *F21V 17/06* | (2006.01) |
| *F21V 19/00* | (2006.01) |

(52) U.S. Cl.
CPC ................ *G09F 13/14* (2013.01); *F21V 17/04* (2013.01); *F21V 17/06* (2013.01); *F21V 19/001* (2013.01); *F21V 19/0035* (2013.01)
USPC .......................... 362/97.1; 362/97.2; 362/97.3

(58) Field of Classification Search
CPC ........... F21V 7/07; F21V 7/06; F21V 19/001; F21V 19/0035; G09F 13/14
USPC ........................ 362/97.1, 97.2, 97.3
See application file for complete search history.

(56) References Cited

U.S. PATENT DOCUMENTS

| | | | |
|---|---|---|---|
| 7,059,736 B2 * | 6/2006 | Yu et al. ........................ | 362/97.1 |
| 7,163,328 B2 * | 1/2007 | Chang et al. .................. | 362/97.2 |
| 7,413,318 B2 * | 8/2008 | Hsu et al. ...................... | 362/97.1 |

* cited by examiner

*Primary Examiner* — David V Bruce
(74) *Attorney, Agent, or Firm* — Ladas & Parry LLP

(57) ABSTRACT

An embodiment of the disclosed technology discloses a backlight source and a display device. The backlight source including a back plate, an optical film, a light source bracket located between the back plate and the optical film, and a light source mounted onto the light source bracket; the light emitted from the light source is radiated toward the optical film after being reflected by the back plate.

14 Claims, 4 Drawing Sheets

BACKLIGHT SOURCE AND DISPLAY DEVICE

BACKGROUND

Embodiments of the disclosed technology relates to a backlight source and a display device.

Nowadays, there is typically used a direct-light-type backlight source, as illustrated in FIG. 1, in which an LED (Light Emitting Diode) array 11 is disposed behind a display panel (not shown) and on a back plate 12, and the light emitted from LEDs is reflected by the bottom surface and side surface of the back plate 12, then uniformly radiates outside through an optical assembly 13. The thickness of the direct-light-type backlight source is determined by the distance between back plate 12 and optical film 13. The larger the thickness gets, the longer the light path of the light emitted from the light source to the optical film becomes, then the uniformity of the backlight source become better. In the case of a thinner backlight source, colors and brightness uniformity become the key points for a direct-light-type backlight source.

As to the current large-size direct-light-type LED backlight source, the stiffness of an optical film itself is relatively weaker, and prone to be sunk in its central portion, which causes great interference and accordingly non-uniform image quality.

SUMMARY

Embodiments of the disclosed technology provides a backlight source and a display device capable of reducing the interference induced by an optical film, improving the image quality of a display screen, and facilitating to realize a lower profile of the backlight source.

According to an embodiment of this disclosed technology, a backlight source is provided, including: a back plate, an optical film, a light source bracket located between the back plate and the optical film, and a light source mounted on the light source bracket. The light emitted from the light source is radiated toward the optical film after being reflected by the back plate.

According to another embodiment of the disclosed technology, a display device is provided, comprising: a display panel and the above-mentioned backlight source, which is located below or behind the display panel.

Embodiments of the disclosed technology provides a backlight source and a display device, which, by using a light source bracket supported between an optical film and a back plate, preventing the interference caused by the sink of the optical film. Moreover, the light source is disposed in an upside down manner in a light source bracket, such that most of the light is reflected by the back plate bottom and then arrives at the optical film, increasing light path and facilitating to realize a lower profile of backlight source.

Further scope of applicability of the disclosed technology will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
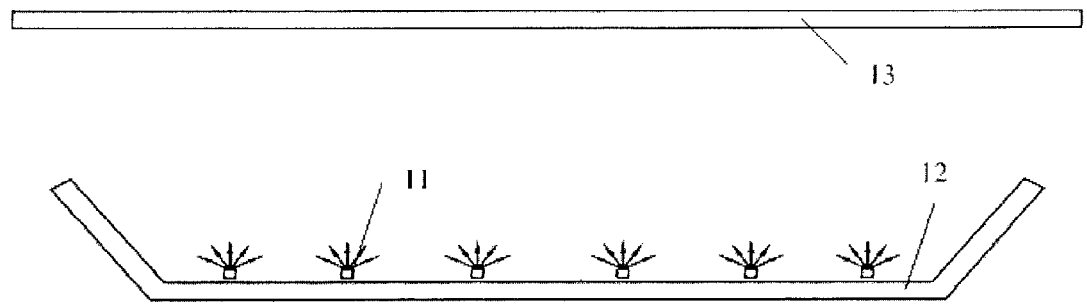
FIG. 1 is a structural view schematically illustrating a conventional backlight source.

A further detailed description of the embodiments of the disclosed technology will be made in combination with the accompanying drawings. The description and the drawings are given only for the purpose of illustration but not for limitative purpose. Here, "a" and "an" means at least one.

An embodiment of the disclosed technology provides a backlight source, comprising: a back plate, an optical film, a light source bracket located between the back plate and the optical film, and a light source mounted on the light source bracket. The light emitted from the light source is radiated toward the optical film after being reflected by the back plate.

In one example, the bottom of the light source bracket is placed or fixed onto the back plate, and the top of the light source bracket supports said optical film. The light source bracket is provided to maintain the gap space between the back plate and the optical film.

In one example, the light source bracket is constructed of a transparent material, so as to enable the light emitted from the light source transmit therethrough and then radiate onto the optical film for display.

In one example, the bottom of the light source bracket comprises at least three first supporting aims, any two of them being connected together; the joint between every two first supporting arms is connected to one end of a second supporting arm respectively, and the other ends of all the second supporting arms are connected together. Each of the first supporting arm is convex-shaped, and all the first supporting arms co-support a light source mounting surface, onto which the light source is disposed.

For example, the bottom of the light source bracket comprises three first supporting arms, any two of them being connected together; the joint between every two first supporting arms is connected to one end of a second supporting arm respectively, and the other ends of the three second supporting arms are connected together. The first supporting arms are convex-shaped, and the three first supporting arms co-support the light source mounting surface. Or, the first supporting arms are arched-type; furthermore, the number of the first supporting arm may be any one, such as 4, 5 and more.

In this way, the light source bracket bottom is placed or fixed to the back plate, and the top thereof supports the optical film so as to stabilize the optical film. Further, in one example, the light source bracket bottom is triangle-shaped, therefore having a stable construction and being difficult to be deformed.

Furthermore, the light source bracket can also be any other suitable shape formed of transparent sheets, such as cone, cylinder, sphere or irregular structure and the like, as long as the light source bracket can be provided between the back plate and the optical film for supporting the optical film and amounting the light source. For example, the light source bracket may be cone-shaped while formed of four triangle-shaped transparent sheets; the central portion of the transparent sheet having a triangle-shaped bottom protrudes toward the optical film, thus forming a light source mounting surface of a boss-shape. The extent of protruding upward can adjust the distance from the light emitted by the light source to the optical film. Furthermore, the other respective triangle-shaped transparent sheets can also assume an inward-sunk shape. Also, the light source bracket can present a cubic structure, which has a light source mounting surface for fixing light source.

Moreover, the light source bracket described above not only can be assembled with respective supporting arms or transparent sheets, but also can be formed by molding integrally by injection molding.

In one example, the light source is mounted in an upside down manner onto the above described light source mounting surface. The light source can be fixed in an upside down manner onto the above described light source mounting surface with transparent adhesive, and furthermore, the angle of the optical axis of the light source to vertical direction may be in a range between 0° to 45°, so as to lengthen the distance from the light emitted from luminous surface of the light source to the optical film. Absolutely, this angle can be adjusted as necessary.

Also, the leads of the light source are connected with a driver circuit amounted for example on the back plate via the bottom of the light source bracket.

Hereinafter, a detailed description about an embodiment of the backlight source according to the disclosed technology is afforded in conjunction with drawings.

Figure 2:
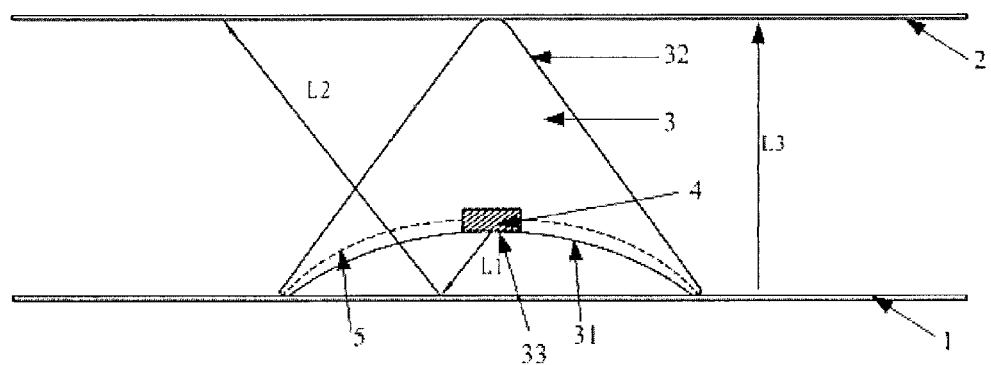
FIG. 2 is a structural view schematically illustrating a backlight source according to an embodiment of the disclosed technology.

As shown in FIG. 2, the embodiment of the disclosed technology provides a backlight source, comprising: a back plate 1, an optical film 2 above the back plate 1, a light source bracket 3 and a light source 4 located between the back plate 1 and the optical film 2. The bottom of the light source bracket 3 comprises three first supporting arms 31, any two of them being connected with each other; the joint between every two first supporting arms 31 is connected to one end of a second supporting arm 32 respectively, and the other ends of the three second supporting arms 32 are connected together. The first supporting arm 31 is arched-shaped, and three first supporting aims 31 co-support a light source mounting surface 33. Any two of the above described three supporting arms form an angle of 120° between them. A light source 4 such as an LED can be disposed vertically in a upside down manner onto the light source mounting surface 33, and the light emitted therefrom is reflected to optical film 2 by the back plate 1, thus the light path of the light to the optical film 13 is approximately the sum of L1 and L2; in contrast, the light path of the light to the optical film in the conventional technology as shown in FIG. 1 is approximately L3. Thus, it's obvious that L1+L2>L3. On the other hand, if the light path of the backlight source provided by the embodiment of the disclosed technology is same to that of the backlight source in the conventional technology, the embodiment can have a smaller distance between the optical film and the back plate.

Also, the leads 5 of the light source 4 connected with a driver circuit (not shown) mounted on the back plate 1 via the bottom of the light source bracket 3. For example, the two leads 5 can be connected with the driver circuit on the back plate 1 through one of the first supporting arms 31.

Figure 3:
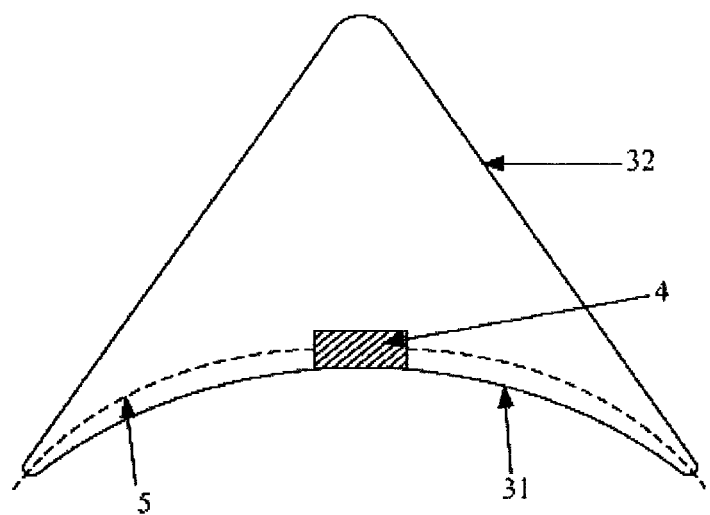
FIG. 3 is a side view illustrating a light source bracket according to the embodiment of the disclosed technology.
Figure 4:
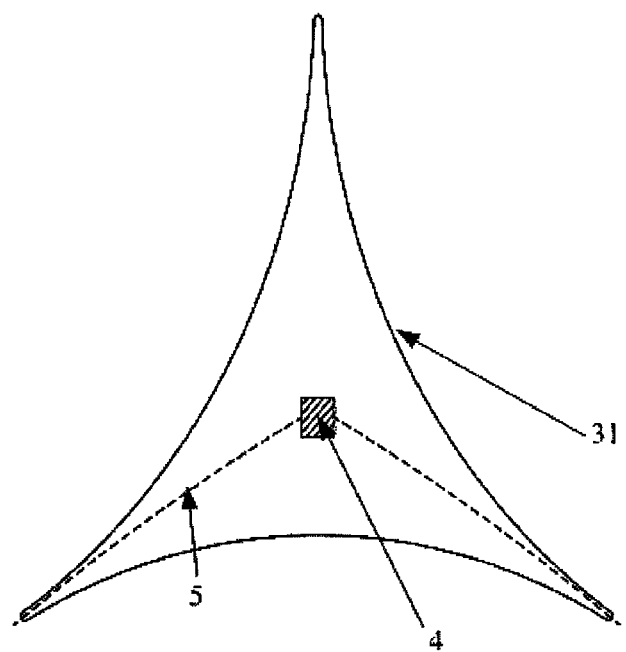
FIG. 4 is a schematic view illustrating the light source bracket according to the embodiment of the disclosed technology.
Figure 7:
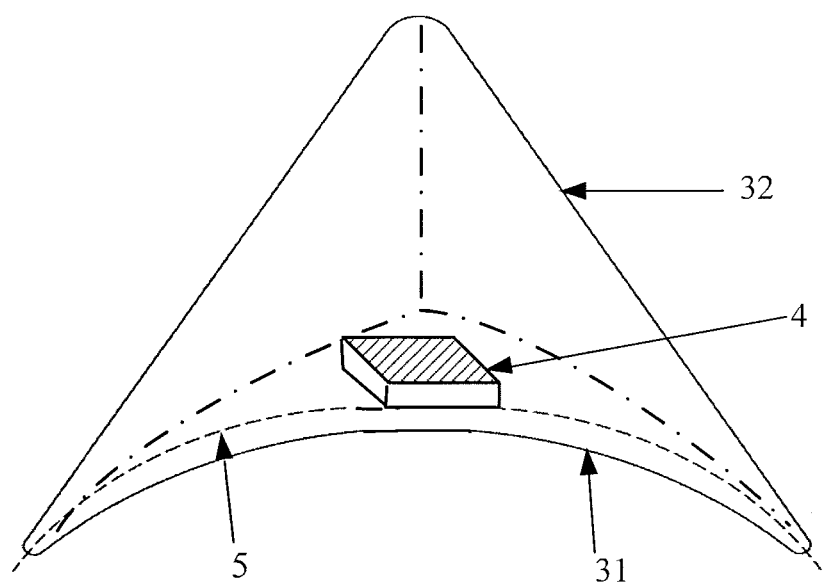
FIG. 7 is an elevation view of the backlight source as shown in FIG. 2.

Here, FIG. 3 is a side view of the light source bracket 3, FIG. 4 is a bottom view of the light source bracket 3, and FIG. 7 is an elevation view of the light source bracket 3. As shown in FIG. 3, FIG. 4 and FIG. 7, the light source is positioned inversely onto the light source mounting surface 33, and the two leads 5 are connected with a driver circuit on the back plate 1 through two first supporting arms 31.

The above mentioned light source bracket 3 may also be cone-shaped and formed of four triangle-shaped transparent sheets; the central portion of the bottom triangle-shaped transparent sheet protruding toward the optical film, thus forming a light source mounting surface in a boss-shape. In this way, the light source 4 can be placed onto the light source mounting surface.

Figure 5:
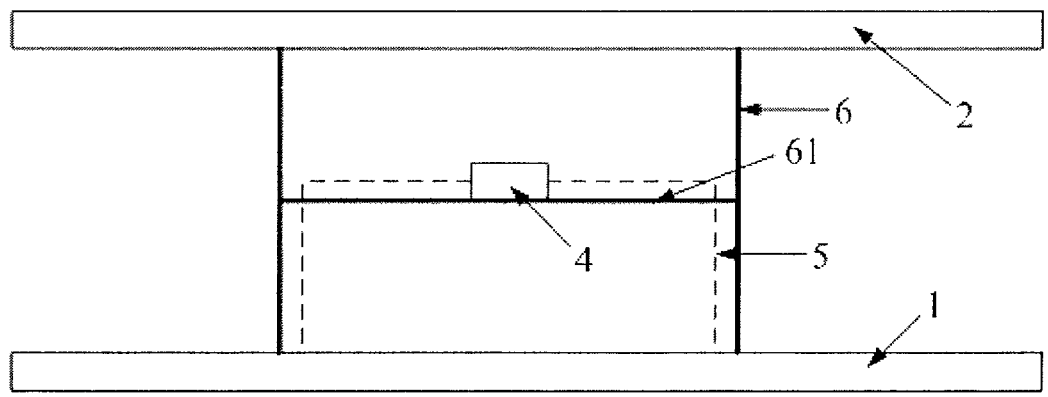
FIG. 5 is a structural view schematically illustrating the backlight source according to another embodiment of the disclosed technology.
Figure 6:
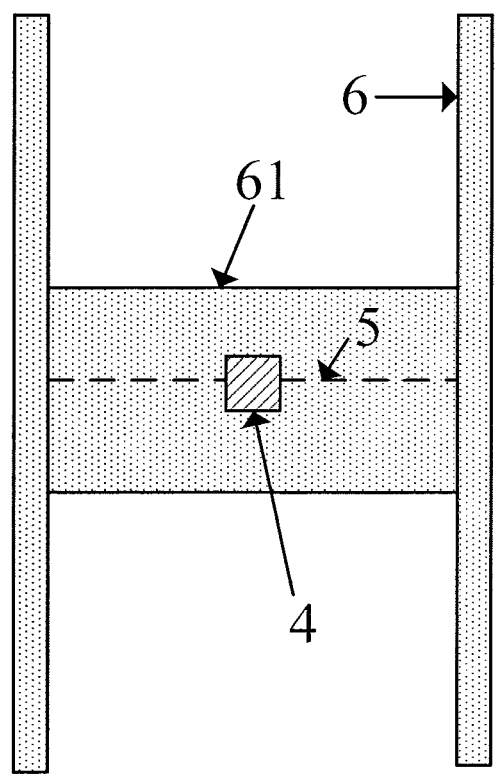
FIG. 6 is a top view of the backlight source as shown in FIG. 5.

As shown in FIG. 5-FIG. 6, another embodiment of the disclosed technology provides a backlight source. FIG. 5 shows a side view of the backlight source, and FIG. 6 shows a top view of the backlight source. As shown, this backlight source comprises: a back plate 1, an optical film 2 above the back plate 1, a light source bracket 6 and a light source 4 located between the back plate 1 and the optical film 2. The light source bracket 6 assumes a cubic structure, which structure has a light source mounting surface 61. The light source bracket 6 is located between the optical film 2 and the back plate 1, supporting the optical film and preventing the same from being sunk especially in the central portion. Furthermore, the light path from the light source to the optical film can be controlled by adjusting the distance between the light source mounting surface 61 and the back plate 1.

Also, the leads 5 (illustrated with dotted lines) of the light source 4 are connected with a driver circuit (not shown) mounted on the back plate 1 via the bottom of the light source bracket 6.

The above described light source bracket can be further in any suitable shape, as long as it support the optical film and can realize the inversed arrangement of the light source. The angle of the inverse direction of the light source to the vertical direction may be ranged between 0° to 45°, so as to lengthen the distance from the light emitted from the light source to the optical film on an upper level. Also, the abutting portion between the light source bracket and optical film can be designed with a certain curvature, so as to enable smooth contacting therebetween, avoiding damages like scratches to the optical film.

Another embodiment of the disclosed technology also provides a display device, comprising display panel, and further comprises the above-mentioned backlight source, which is located below the display panel. The panel is a liquid crystal panel of any type.

Here, the backlight source comprises a back plate, an optical film, a light source bracket located between the back plate and the optical film, and a light source mounted onto the light source bracket; and the light emitted from the light source radiates toward the optical film after being reflected by the back plate.

In the embodiments of the disclosed technology, the optical film may comprise stacked films, such as a lens film, a diffusion film, prism film to realize the respective optical function.

As can be seen from the above, the embodiments of the disclosed technology provide a backlight source and a display device, which, by using light source bracket supported between the optical film and the back plate, are capable of significantly preventing the interference caused by the sink of the optical film. Moreover, the inversed arrangement of the light source in the light source bracket enables most light transmit to the optical film after reflected by the back plate, increasing light path and facilitating to realize a lower profile of the backlight source.

Apparently, various modifications and alternations can be made by the skilled on in this art without departing from the spirit and scope of this disclosed technology. Thereby, this disclosed technology intends to encompass all such modifications and alternations, provided they are within the scope of the claims of this disclosed technology and its equivalents.

What is claimed is:

1. A backlight source, comprising:
    a back plate,
    an optical film,
    a light source bracket located between the back plate and the optical film, and
    a light source mounted onto the light source bracket;
    wherein the light emitted from the light source radiates toward the optical film after being reflected by the back plate.

2. The backlight source according to claim 1, wherein the light source bracket is formed of a transparent material.

3. The backlight source according to claim 1, wherein the bottom of the light source bracket comprises at least three first supporting arms, any two of them being connected with together; the joint between every two first supporting arms is connected to one end of a second supporting arm respectively, the other ends of all the second supporting arms are connected together, and
    wherein the first supporting arms are convex-shaped, and all the first supporting arms co-support a light source mounting surface, onto which the light source is disposed.

4. The backlight source according to claim 3, wherein the first supporting arms are arched-shaped.

5. The backlight source according to claim 3, wherein the light source bracket is cone-shaped, and
    a central portion of the bottom surface of the light source bracket protrudes toward the optical film, thus forming a light source mounting surface in a boss-shape.

6. The backlight source according to claim 1, wherein the light source bracket is of cubic structure with a light source mounting surface being arranged therein.

7. The backlight source according to claim 3, wherein the light source is mounted in an upside down manner onto the light source mounting surface.

8. The backlight source according to claim 5, wherein the light source is mounted in an upside down manner onto the light source mounting surface.

9. The backlight source according to claim 6, wherein the light source is mounted in an upside down manner onto the light source mounting surface.

10. The backlight source according to claim 7, wherein an angle of the direction of optical axis of the light source with respect to the vertical direction is in a range between 0° to 45°.

11. The backlight source according to claim 8, wherein an angle of the direction of optical axis of the light source with respect to the vertical direction is in a range between 0° to 45°.

12. The backlight source according to claim 9, wherein an angle of the direction of optical axis of the light source with respect to the vertical direction is in a range between 0° to 45°.

13. The backlight source according to claim 1, wherein the bottom of the light source bracket is fixedly arranged onto the back plate, and the top of the light source bracket supports the optical film thereon.

14. A display device comprising: a display panel, and the backlight source according to claim 1, which is located below or behind the display panel.

* * * * *